United States Patent
Ocampo Echeverri et al.

(10) Patent No.: US 11,814,586 B2
(45) Date of Patent: Nov. 14, 2023

(54) SOLVOTHERMAL LIQUEFACTION PROCESS FROM BIOMASS FOR BIOCRUDE PRODUCTION

(71) Applicants: CEMENTOS ARGOS S.A., Medellín (CO); UNIVERSIDAD DE ANTIOQUIA, Medellín (CO)

(72) Inventors: David Ocampo Echeverri, Medellín (CO); Luis Alberto Rios, Medellín (CO); Elkin Andrés Gómez Mejía, Medellín (CO); Gabriel Jaime Vargas Betancur, Medellín (CO)

(73) Assignees: Cementos Argos S.A., Medellin (CO); Universidad de Antioquia, Medellin (CO)

( * ) Notice: Subject to any disclaimer, the term of this patent is extended or adjusted under 35 U.S.C. 154(b) by 0 days.

(21) Appl. No.: 17/814,240

(22) Filed: Jul. 22, 2022

(65) Prior Publication Data
US 2023/0043762 A1 Feb. 9, 2023

Related U.S. Application Data

(60) Provisional application No. 63/224,454, filed on Jul. 22, 2021.

(51) Int. Cl.
*C10G 1/04* (2006.01)

(52) U.S. Cl.
CPC ............... *C10G 1/04* (2013.01); *C10G 1/047* (2013.01); *C10G 2300/1014* (2013.01);
(Continued)

(58) Field of Classification Search
CPC .. C10G 1/04; C10G 1/047; C10G 2300/1014; C10G 2300/202; C10G 2300/205;
(Continued)

(56) References Cited

U.S. PATENT DOCUMENTS

| | | | |
|---|---|---|---|
| 2012/0144730 A1* | 6/2012 | Stamires | C10L 1/02 44/307 |
| 2017/0001933 A1* | 1/2017 | Johnson | C10G 3/44 |

(Continued)

FOREIGN PATENT DOCUMENTS

| | | |
|---|---|---|
| CN | 105733693 A | 7/2016 |
| WO | 2014022218 A1 | 2/2014 |

OTHER PUBLICATIONS

Yang et al. ("Near- and supercritical ethanol treatment of biocrude from hydrothermal liquefaction of microalgae", Bioresource Technology 211 (2016) 779-782). (Year: 2016).*

(Continued)

*Primary Examiner* — Ali Z Fadhel
(74) *Attorney, Agent, or Firm* — The Morales Law Firm; Joseph L. Morales, Esq.

(57) ABSTRACT

The present disclosure refers to a process of obtaining a biocrude from biomass, where said process comprises the solvothermal liquefaction of the biomass in the presence of a mixture of solvents, until obtaining a gaseous phase, a solid phase, an aqueous liquid phase and an organic liquid phase comprising the biocrude. Wherein the mixture of solvents comprises between 0.5% w/w to 99.5% w/w of water and at least one solvent; and wherein the solvent is selected from alcohols, ketones, aldehydes, or precursors thereof under the processing conditions. The process described herein allows the use of biomass for the production of renewable fuels, as well as obtaining a biocrude with a yield greater than or equal to 30%, with a calorific value between 20 and 35 MJ/Kg and with a sulfur percentage lower than 1% w/w.

10 Claims, 5 Drawing Sheets

(52) U.S. Cl.
CPC . *C10G 2300/202* (2013.01); *C10G 2300/205* (2013.01); *C10G 2300/302* (2013.01); *C10G 2300/304* (2013.01); *C10G 2300/308* (2013.01)

(58) Field of Classification Search
CPC ........ C10G 2300/302; C10G 2300/304; C10G 2300/308
See application file for complete search history.

(56) References Cited

U.S. PATENT DOCUMENTS

| | | | |
|---|---|---|---|
| 2018/0002607 A1* | 1/2018 | Bachmann Nielsen | C10G 1/042 |
| 2018/0163142 A1* | 6/2018 | Boon | C10G 3/00 |
| 2019/0270936 A1 | 9/2019 | Lali | |
| 2020/0283684 A1* | 9/2020 | Kouris | C10L 1/026 |
| 2020/0308500 A1* | 10/2020 | Xu | C10L 1/02 |
| 2021/0284916 A1* | 9/2021 | Iversen | C10G 3/42 |

OTHER PUBLICATIONS

Liu et al. ("Effects of various solvents on the liquefaction of biomass to produce fuels and chemical feedstocks", Energy Conversion and Management 49 (2008) 3498-3504). (Year: 2008).*

Liu, Z. & Zhang, F. 2008. Energy Conversion and Management, 4: 3498-3504.

Peng, X., Ma, X., Lin, Y., Wang, X., Zhang, X., & Yang, C. (2016). Effect of process parameters on solvolysis liquefaction of chlorella pyrenoidosa in ethanol-water system and energy evaluation. Energy Conversion and Management, 117, 43-53. https://doi.org/10.1016/j.enconman.2016.03.029.

Osorio, A., Gómez, E., Ocampo, D., & Rios, L. A. (2019). Licuefacción Solvotérmica de Madera de acacia (acacia mangium). Información Tecnológica, 30(2), 211-222. https://doi.org/10.4067/s0718-07642019000200211.

Guo, Y., Yeh, T., Song, W., Xu, D., & Wang, S. (2015). A review of bio-oil production from hydrothermal liquefaction of algae. Renewable and Sustainable Energy Reviews, 48, 776-790. https://doi.org/10.1016/j.rser.2015.04.049.

Yuan, X., Wang, J., Zeng, G., Huang, H., Pei, X., Li, H., Liu, Z., & Cong, M. (2011). Comparative studies of thermochemical liquefaction characteristics of microalgae using different organic solvents. Energy, 36(11), 6406-6412. https://doi.org/10.1016/j.energy.2011.09.031.

Anastasakis, K., & Ross, A. B. (2011). Hydrothermal liquefaction of the Brown macro-alga Laminaria Saccharina: Effect of reaction conditions on product distribution and composition. Bioresource Technology, 102(7), 4876-4883. https://doi.org/10.1016/j.biortech.2011.01.031.

* cited by examiner

SOLVOTHERMAL LIQUEFACTION PROCESS FROM BIOMASS FOR BIOCRUDE PRODUCTION

TECHNICAL FIELD

The present development is related to the field of the chemical industry, particularly with physicochemical processes to produce biocrude from organic material, and more particularly with a solvothermal liquefaction process for the production of biocrude from biomass.

BACKGROUND

The growing energy consumption worldwide has generated a significant decrease in the availability of non-renewable energy sources, as well as a strong environmental deterioration due to the exploration, processing and use of these sources. These factors create the imminent need to generate liquid and gaseous fuels from renewable sources through efficient, economically viable and nature-friendly processes.

One of the most studied alternatives to solve the above problems is the use of biomass in the generation of biofuels and other bioproducts of industrial interest. The foregoing, taking into account that biomass is the fourth source of renewable energy in the world and, theoretically, has the capacity to provide 100% of the energy requirements at a global level (UPME/Ministry of Mines and Energy, Republic of Colombia, 2010). Additionally, the use of this energy source allows maintaining the carbon balance in the biosphere, which translates into a reduction in the generation and accumulation of atmospheric $CO_2$. The transformation of biomass into biofuels and associated products can be carried out through thermal, physicochemical and biological processes. However, all of these present difficulties in terms of efficiency and product yields that prevent, in many cases, their economic sustainability.

There is, e.g., solvothermal liquefaction, which allows the conversion of biomass into a biocrude with a high energy densification, which can be subjected to combustion or taken to refining processes to obtain liquid fuels with higher added value such as diesel and gasolines. Solvothermal liquefaction allows high mass yields to be obtained in the production of biocrude, with around 80% energy recovery from biomass, above other similar technologies. Similarly, solvothermal liquefaction facilitates obtaining more stable fuels with a lower number of heteroatoms (e.g., sulfur, nitrogen, oxygen); and the reduction of energy costs associated with the biomass drying process, since the liquefaction can be carried out in aqueous reaction media.

There are several studies that have evaluated the impact of different variables of the solvothermal liquefaction process on the product yields obtained. Liu and Zhang evaluated the effect of different pure solvents, i.e., not diluted with another substance, on the transformation of pine wood by solvothermal liquefaction. The authors report that both the yields and the distribution and relative abundance of the products obtained are affected by the type of solvent used in the liquefaction, and that higher temperatures (around 400° C.) favor the yields when the process is carried out in presence of ethanol and acetone, compared to water (Liu, Z. & Zhang, F. 2008. *Energy Conversion and Management*, 49: 3498-3504).

On the other hand, US2019/0270936 discloses a catalytic liquefaction method in the presence of organic solvents for the production of biocrude from biodegradable waste. In this patent, it is indicated that the use of a liquid ionic catalyst in the process, particularly an ionic Brønsted acid, makes it possible to obtain a product with a high flash point (66-70° C.), a low ash content, a high stability and a calorific value between 10 and 35 MJ/Kg.

On the other hand, CN105733693 refers to a method of solvothermal biomass liquefaction to obtain bio-oils, which comprises the use of an alcohol-water mixture, where said alcohol is methanol, ethanol or ethylene glycol. This process makes it possible to obtain a bio-oil with a calorific value between 34 and 38 MJ/Kg, with final yields between 80 and 85% from biomass of algae such as *Spirulina* sp. and *Chlorella* sp., and lignocellulosic residues such as pine wood and rice husks.

Although there are numerous studies related to biomass liquefaction and pilot systems have been developed for the production of biocrude, the process still has limitations that make its industrial implementation difficult. Among these limitations are the low yields of biocrude obtained; and the costs associated with the use of organic solvents, temperatures above 200° C., and the processes of separation and purification of secondary components (i.e., catalysts, solvents). All this translates into high production costs and consequently the financial infeasibility of these processes.

BRIEF DESCRIPTION

The present disclosure refers to a process for obtaining a biocrude from biomass, which comprises subjecting a biomass to solvothermal liquefaction in the presence of a mixture of solvents, until obtaining a gaseous phase, a solid phase, an aqueous liquid phase and an organic liquid phase comprising the biocrude. The biocrude obtained with this process is characterized by having a percentage of sulfur less than or equal to 1%.

DETAILED DESCRIPTION

For purposes of interpreting the terms used throughout this document, their usual meaning in the technical field should be taken into account, unless a particular definition is incorporated or the context clearly indicates otherwise. Additionally, terms used in the singular form will also include the plural form.

The development described herein corresponds to a process to obtain a biocrude from biomass, which comprises subjecting said biomass to solvothermal liquefaction in the presence of a mixture of solvents, thus obtaining a gaseous phase, a solid phase, an aqueous liquid phase and an organic liquid phase comprising the biocrude. Additionally, after separation and purification processes, the solvent mixture is recovered and reintegrated into the solvothermal liquefaction process.

The term biomass refers to organic matter derived from a biological process, which can be used as an energy source. The biomass used in the process of obtaining biocrude can be used in concentrations of 5% w/w to 70% w/w, 5% w/w to 25% w/w, 5% w/w to 15% w/w, 15% w/w to 40% w/w, 25% w/w to 50% w/w, 35% w/w to 60% w/w and 50% w/w to 70% w/w.

In one embodiment, the biomass used in the process of obtaining biocrude corresponds to lignocellulosic residues, where said residues are selected from, but are not limited to, rice husks, pine wood, oil palm, acacia wood, wood paulownia or any lignocellulosic residue known to a person of ordinary skill in the art.

In another embodiment, the biomass used corresponds to microalgae biomass, where said microalgae are selected from the group comprising the genera *Anabaena, Chlorella, Chlorophyta, Cryptophyta, Dictyosphaerium, Dinophyta, Euglena, Glaucophyta, Haematococcus, Hydrodictyon, Microcystis, Nodularia, Oscillatoria, Phaeophyta, Rhodophyta, Scenedesmus, Spirogyra, Spirulina* and *Tribophyta*. In another embodiment, the microalgal biomass preferably has an ash content of less than 20% and an organic material content of greater than 80%.

The biomass used in the process of obtaining biocrude is characterized by having a nitrogen content between 0% and 20% or between 0% and 10%. The biomass used is also characterized by having a lipid content of less than 50% or between 0% and 50%.

In one embodiment, the biomass is treated before being subjected to solvothermal liquefaction. Said treatment comprises reducing the particle size of the biomass, e.g., by maceration, crushing, grinding or a combination thereof, or any operation known to a person of ordinary skill in the art.

Biocrude is understood as the product derived from biomass that, similarly to crude oil, can be converted into other fuels such as diesel or gasoline. The biocrude or bio-oil obtained from the present disclosure is composed, in a non-limiting manner, of medium chain hydrogenated aliphatic hydrocarbons; branched aliphatic hydrocarbons with methyl and ethyl functional groups; aromatic hydrocarbons; nitrogenous compounds such as pyridines and quinolines; short chain compounds and long chain compounds.

In one embodiment, the biocrude obtained is characterized by having a percentage of sulfur less than or equal to 5%. In a particular embodiment, the biocrude obtained is characterized by having a percentage of sulfur less than or equal to 1%.

In some embodiments of the disclosure, the biocrude obtained has a heating value between 10 and 40 MJ/Kg, between 10 and 20 MJ/Kg, between 15 and 30 MJ/Kg or between 20 and 40 MJ/Kg.

Solvothermal liquefaction corresponds to the physicochemical conversion of biomass into products of industrial interest by applying high temperatures in presence of one or more solvents in a supercritical state. Depending on the type of biomass, solvents and their concentration in relation to said biomass, different ranges of temperature, pressure and time are used in solvothermal liquefaction. In particular, solvothermal liquefaction can reach temperatures between 200° C. and 400° C., between 250° C. and 350° C., between 250° C. and 300° C., between 275° C. and 325° C., or between 300° C. and 350° C. Solvothermal liquefaction can reach pressures of 5 to 20 MPa, or between 10 and 15 MPa.

Likewise, the solvothermal liquefaction can last between 5 and 90 minutes, between 15 and 45 minutes, between 30 and 60 minutes, between 45 and 75 minutes, or between 60 and 90 minutes. Optionally, the solvothermal liquefaction is carried out with agitation, where said agitation is carried out between 150 and 1000 rpm; between 300 and 1000 rpm; between 300 and 700 rpm; between 200 and 750 rpm or between 250 and 500 rpm.

Solvothermal liquefaction of biomass can be carried out in the presence of a reducing atmosphere. For example, the gas used to generate the reducing atmosphere is selected from hydrogen, carbon monoxide (CO), carbon dioxide ($CO_2$), nitrogen ($N_2$) or a combination thereof, pure or mixed with other gases such as oxygen, water steam and helium.

Solvothermal liquefaction can be carried out in the presence of a catalyst, a substance that increases the speed and facilitates the conversion of biomass during the solvothermal liquefaction process. The catalyst used in the process is selected in a non-limiting manner from the group comprising alkali and alkaline earth metal carbonates, bicarbonates, acetates, or a combination thereof. In a particular embodiment, the catalyst is selected from the group comprising, but not limited to, potassium carbonate ($K_2CO_3$), sodium carbonate ($Na_2CO_3$), sodium bicarbonate ($NaHCO_3$) and calcium carbonate ($CaCO_3$), or combinations thereof, or any other known to a person of ordinary skill in the art. The catalyst is used in a concentration between 0.1% w/w and 20% w/w, between 0.5% w/w and 10% w/w, between 1% w/w and 5% w/w, between 5% w/w and 10% w/w, between 7 and 12% w/w, between 10% w/w and 15% w/w, or between 15% w/w and 20% w/w.

The term solvent describes any substance that can dissolve and produce a homogeneous mixture with another substance. In the solvothermal liquefaction process, the solvent or mixture of solvents of the present development allows obtaining biocrudes with different ratios of functional hydrocarbons, favoring the obtaining of medium-chain aliphatic hydrocarbons and compounds with low content of heteroatoms. In the present disclosure, the mixture of solvents used in the solvothermal liquefaction comprises between 0.5% w/w to 99.5% w/w of water and at least one solvent. Wherein the solvent is selected from, but not limited to, alcohols, ketones, aldehydes, or precursors thereof under processing conditions. The water of the solvent mixture is found in a concentration between 70% w/w and 99.5% w/w, between 88% w/w and 99.5% w/w; between 92% w/w and 99.5% w/w or between 96% w/w and 99.5% w/w.

The solvents present in the solvent mixture correspond to primary, secondary or tertiary alcohols, whose chains comprise between 1 to 10 carbon atoms, or a combination thereof. For example, when the alcohol is primary, it is selected from methanol, ethanol or ethylene glycol; when the alcohol is secondary, it is selected from isopropanol, isobutanol or isopentanol; and when the alcohol is tertiary, it is selected from t-butanol, 3-ethyl-3-pentanol or 3-methyl-3-hexanol.

When the solvents correspond to aldehydes, they have the formula $R_1$—CO—H, where $R_1$ represents hydrocarbons between 1 and 10 carbons. For example, the aldehydes present in the solvent mixture are selected from formaldehyde, acetaldehyde, pentanaldehyde, or a combination thereof.

When the solvents correspond to ketones, they have the formula $R_1$—CO—$R_2$, where $R_1$ and $R_2$ represent hydrocarbons between 1 and 10 carbons. For example, the ketones present in the solvent mixture are selected from acetone, methyl ethyl ketone, pentanone, butanone, methyl cyclohexanone, or a combination thereof.

The mixing ratio of solvents and biomass used in the solvothermal liquefaction process is in a range between 20:1 and 1:5, between 10:1 and 1:3 or between 5:1 and 1:1.

Figure 1:
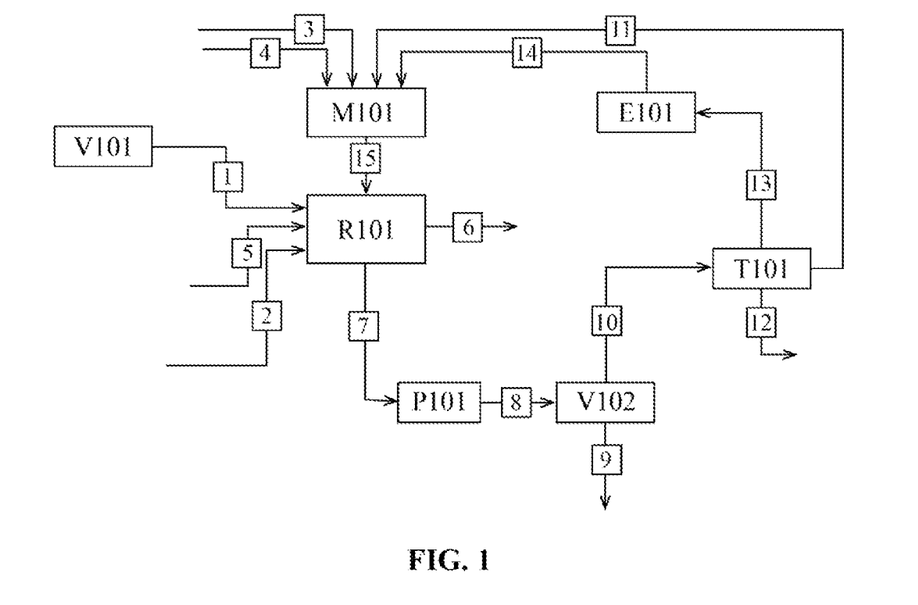
FIG. 1 Separation diagram of solvothermal liquefaction products. [1] Reducing atmosphere gas; [2] Biomass; [3] Fresh water; [4] Fresh solvent; [5] Catalyst; [6] Reaction gases; [7] Mixture of dissolved and undissolved biocrude in a water-solvent mixture and solid waste; [8] Mixture of dissolved and undissolved biocrude in a water-solvent mixture and solid waste; [9] Solid waste; [10] Mixture of dissolved and undissolved biocrude in a water-solvent mixture; [11] Aqueous liquid phase; [12] Organic liquid phase; [13] Solvent recovered; [14] Solvent recovered; [15] Mixture of fresh water and solvent, and recovered water and solvent; V101: Tank; R101: Stirred Tank Reactor; V102: Filtration system; E101: Condenser; M101: Mixer; T101: Distillation column; P101: Pump.

As illustrated in FIG. 1, once the solvothermal liquefaction of the biomass is finished, the products obtained are cooled by means of a refrigeration system until they reach a temperature of approximately 30° C. Then the gas phase [6] obtained is released and subsequently burned in a furnace to recover thermal energy.

The residual solids present in the solid phase [8] are separated from the biocrude and from the solvent or mixture of solvents, e.g., by filtration, and can be subsequently burned to generate thermal energy [9]. On the other hand, the liquid phase [10] obtained in the solvothermal liquefaction process is subjected to a simple distillation process, where the solvent is recovered [13], and subsequently to a separation process (e.g., decantation), where an aqueous liquid phase [11] is recovered, comprising water and the catalyst, and the organic liquid phase, which contains the biocrude [12].

In a particular embodiment of the disclosure, the aqueous liquid phase is recovered and reintegrated into the solvothermal liquefaction process. In another particular embodiment, the aqueous liquid phase is returned to the solvothermal liquefaction in a percentage between 50% and 100%, between 60% and 100%, between 70% and 100%, between 80% and 100% or between 90% and 100%.

In a particular embodiment of the disclosure, the catalyst present in the aqueous liquid phase is recovered and reintegrated into the solvothermal liquefaction process. In another particular embodiment, the catalyst is reintegrated into the solvothermal liquefaction in a percentage between 50% and 100%, between 60% and 100%, between 70% and 100%, between 80% and 100% or between 90% and 100%.

In a particular embodiment of the disclosure, the solvent used in the solid phase separation processes is recovered and fully or partially reintegrated into the solvothermal liquefaction process. In another particular embodiment, the solvent is returned to the solvothermal liquefaction in a percentage between 50% and 100%, between 60% and 100%, between 70% and 100%, between 80% and 100% or between 90% and 100%.

The solvent, the catalyst and/or the aqueous liquid phase can be reintegrated into the solvothermal liquefaction process, together or individually.

The solvothermal liquefaction process from biomass of the present disclosure allows obtaining biocrude yields between 30% and 99%, between 40% and 85%, or between 50% and 90%.

EXAMPLES

The technological development is presented in detail through the following examples, which are provided for illustrative purposes only, and are not intended to limit its scope.

For all the tests described below, a 250 mL PARR4576 B reactor was used, in which the different operating conditions could be evaluated, such as temperatures, liquid/solid ratios (L/S), reaction times, catalyst, atmospheres, among other variables. For all the tests, 15 g of biomass were used and the ratios of solvent: biomass were adjusted according to each of the tests to be carried out.

According to the separation and refining procedure of the different phases, the quantification of each of them was carried out as follows:

$$Bc(\% \ w/w) = (M_{bc}/(M_{bm}*(100-M_{H_2O}-M_A)))*100$$

$$Res(\% \ w/w) = (M_{res}/(M_{bc}*(100-M_{H_2O})-M_A)))*100$$

$$DAE = (M_{DAE}/(M_{bm}*(100-M_{H_2O})-M_{cat}))*100$$

Bc=Biocrude
$M_{bc}$=Mass of biocrude (g)
$M_{bm}$=Mass of fed biomass (g)
$M_A$=Ashes (g)
$M_{H_2O}$=Water (g)
Res=Residuals
$M_{res}$=Mass of residuals (g)
$M_{cat}$=Mass of catalyst (g)
DAE=Organics dissolved in water
$M_{DAE}$=Mass of organics dissolved in water (g)

To determine the energetic densification, a calorimetric bomb (Automatic Isoperibol Calorimeter Parr 6400) was used under the ASTM D 240 Standard (Heat of Combustion of Liquid Hydrocarbon Fuels by Bomb Calorimeter) and the API gravity was determined by correlation from the density at 15° C. (g/ml), according to ASTM D4052.

Example 1. Effect of the Reducing Atmosphere in the Solvothermal Liquefaction of Acacia Wood To evaluate the effect of the type of gas used in solvothermal liquefaction on the quality of biocrude obtained, two tests were carried out with atmospheres of argon (Ar) and hydrogen ($H_2$), respectively. In each test, Acacia wood (*Acacia mangium*) was used as raw material, and solvothermal liquefaction was carried out at 330° C., using water as solvent in a solvent: biomass ratio of 15:1, and adding $K_2CO_3$ as catalyst, in a concentration of 10% with respect to biomass. The results found are described in Table 1.

TABLE 1

Comparison of reaction atmospheres in the solvothermal liquefaction process with water and Acacia wood

| Reaction atmosphere | Yield (%) | Yield at volatiles <380° C. (%) | HHV* (MJ/Kg) |
|---|---|---|---|
| $H_2$ | 35.26 | 85.82 | 33.68 |
| Ar | 29.12 | 68.12 | 30.08 |

*HHV: calorific value

It was observed that in the presence of a reducing atmosphere, in this case hydrogen, a higher yield was obtained compared to a test without a reducing atmosphere. With hydrogen, greater energy densification was obtained and, in turn, more volatile products, which indicates a better quality biocrude.

Additionally, tests were carried out under the same conditions in which the water was replaced by acetone, and the impact of synthesis gas (50% $H_2$–30% CO–20% $CO_2$) on the solvothermal liquefaction process was evaluated (Table 2).

TABLE 2

Comparison of reaction atmospheres in the solvothermal
liquefaction process with acetone and Acacia wood

| Reaction atmosphere | Yield (%) | Yield at volatiles <380° C. (%) | HHV (MJ/kg) |
|---|---|---|---|
| $H_2$ | 89.29 | 94.12 | 33.91 |
| Ar | 45.56 | 72.12 | 31.18 |
| Syngas | 78.25 | 84.16 | 32.15 |

It was observed that compared to an argon atmosphere, the reducing atmospheres (hydrogen and synthesis gas) allowed to obtain higher yields of biocrude and a higher quality product. Likewise, it was found that the use of acetone as a solvent allows obtaining higher biocrude yields compared to water.

Example 2. Obtaining Biocrude from Microalgae Biomass 2.1 Evaluation of Microalgae Species The trials for obtaining biocrude from microalgae biomass were carried out with the species *Scenedesmus obliquus, Scenedesmus* sp. and *Haematococcus pluvialis*. These tests were carried out with a 3:1 ratio of acetone:biomass, in an $H_2$ atmosphere (initial pressure: 1 MPa) with a percentage of solids of 25%.

The mixture of biomass and solvents in a reducing atmosphere was subjected to a temperature of 300° C. for 30 minutes, under constant stirring at a speed of 450 rpm. Subsequently, and after the reactor cooling process, the separation of each of the phases was carried out for the biocrude quantification.

TABLE 3

Comparison of the process for obtaining biocrude
from microalgae biomass of different species

| Biomass | Raw Biomass HHV (MJ/Kg) | Biocrude HHV (MJ/Kg) | Yield (%) |
|---|---|---|---|
| *Scenedesmus obliquus* | 16.73 | 34.39 | 60.47 |
| *Scenedesmus* sp. | 18.00 | 34.34 | 44.27 |
| *Haematococcus pluvialis* | 15.68 | 31.75 | 61.36 |

The biocrude obtained from the microalgae *Scenedesmus obliquus* has a higher calorific power or energy densification compared to that obtained with the other two microalgae. Regarding the biocrude yield, with the microalgae *Haematococcus pluvialis* a slightly higher value was obtained than that obtained with *Scenedesmus obliquus*. Finally, the low biocrude yield obtained with the microalgae *Scenedesmus* sp. suggests that it is not an appropriate raw material to obtain large amounts of biocrude, which was expected since it contains about 20% w/w of ashes.

The microalgae *Scenedesmus obliquus* stood out both for its high biocrude yield in the liquefaction reaction and for achieving the highest energy densification. This is attributed to the fact that said microalgae presented a higher content of organic material as a percentage of fats, carbohydrates and proteins, as well as the lower content of ashes and the lower oxygen-carbon ratio, which corroborates the results of calorific power or energy densification obtained.

2.2 Evaluation of Operating Conditions in the Solvothermal Liquefaction Process

Starting from the microalgae *Scenedesmus obliquus* and using acetone as a solvent, an experimental design of the response surface type was carried out with the help of Statgraphics 18® Software based on the variables defined below (Table 4):

Input variables: temperature (250° C. to 350° C.), reaction time (15 to 45 minutes) and microalgae biomass concentration (25% to 50%).

Response variables: Fuel yield that corresponds to the biocrude fraction that boils below 388° C. and that quantitatively will be equal to the biocrude yield multiplied by the light fraction (%) and calorific value.

TABLE 4

Experimental design of the conditions of the solvothermal
liquefaction process with *Scenedesmus obliquus*

| Experiment No. | Temperature (° C.) | Time (min) | Microalgae concentration (%) | HHV (MJ/kg) | Biocrude Yield (%) |
|---|---|---|---|---|---|
| 1 | 350 | 30 | 25 | 34.12 | 79.7 |
| 2 | 250 | 45 | 37.5 | 35.22 | 54.4 |
| 3 | 300 | 15 | 25 | 35.08 | 63.6 |
| 4 | 350 | 45 | 37.5 | 36.13 | 47.7 |
| 5 | 250 | 15 | 37.5 | 34.92 | 60.9 |
| 6 | 300 | 30 | 37.5 | 35.43 | 50.6 |
| 7 | 250 | 30 | 50 | 35.33 | 55.8 |
| 8 | 300 | 30 | 37.5 | 27.36 | 55.6 |
| 9 | 300 | 45 | 50 | 35.82 | 43.9 |
| 10 | 300 | 15 | 50 | 35.08 | 47.1 |
| 11 | 300 | 45 | 25 | 32.97 | 82.7 |
| 12 | 350 | 30 | 50 | 36.08 | 37.7 |
| 13 | 350 | 15 | 37.5 | 34.94 | 65.5 |
| 14 | 250 | 30 | 25 | 30.04 | 83 |
| 15 | 300 | 30 | 37.5 | 34.81 | 65.9 |

The results of the response surface analysis showed that the best conditions corresponded to 350° C., an acetone:biomass ratio of 3:1, and a reaction time of 45 minutes. This was validated in a subsequent test, in which a biocrude yield of 81.33% was obtained, which presented a calorific value of 35.51 MJ/Kg and a sulfur concentration of 0.06% w/w. This percentage of sulfur is a valuable quality of the biocrude obtained, since it generates a lower amount of sulfur gases compared to other similar products.

2.3 Evaluation of the Type of Solvent on the Process of obtaining Biocrude

Due to the high operating costs for the use of the pure solvent, in this case acetone, other solvents such as water and ethanol were evaluated, which were used in a 3:1 ratio with respect to the transformed biomass.

TABLE 5

Comparison of the effect of different solvents on
obtaining biocrude from *Scenedesmus obliquus*

| Response variable | Acetone (85% Recovery) | Ethanol (85% Recovery) | Water |
|---|---|---|---|
| Yield (%) | 91.7 | 57.3 | 18.32 |
| Gravity (API) | 13.63 | 5,493 | 10.56 |
| HHV (MJ/kg) | 30.28 | 27.36 | 30.01 |
| OPEX (USD) | 67,275,353 | 54,596,833 | 19,713,489 |

As shown in Table 5, the use of each solvent allowed operating profits to be obtained. However, despite the fact that the operating cost is low when using water, the yield is also low, which is why it does not compensate for the production. On the other hand, when using organic solvents, very good yield is obtained, however, operating costs increase a lot, which significantly worsens financial viability.

2.4 Evaluation of the Solvent: Biomass Ratio on the Process of obtaining Biocrude To determine the effect of the solvent: biomass ratio on the yield and calorific value of the biocrude obtained, tests were carried out with acetone in ratios of 3:1; 2:1; 1:1; 1:2 and 1:3, in which the biocrude yield obtained and the calorific power of the biocrude were evaluated (Table 6).

TABLE 6

Comparison of the effect of different ratios of acetone:biomass on obtaining biocrude from *Scenedesmus obliquus*

| Response variables | 3:1 ratio | 2:1 ratio | 1:1 ratio | 1:2 ratio | 1:3 ratio |
|---|---|---|---|---|---|
| Yield (%) | 91.7 | 69.3 | 47.6 | 31.2 | 25.4 |
| HHV (MJ/Kg) | 30.28 | 30.52 | 30.11 | 31.25 | 30.33 |

Without wishing to be bound by theory, the yield loss evidenced by using a solvent: biomass ratio below 1:1 can be attributed to thermal degradation of the biomass.

2.5 Evaluation of the Solvent Concentration on the Process of obtaining Biocrude In order to reduce operating costs and at the same time increase the yield in the biocrude production, a series of experiments were carried out for a mixing ratio of solvents: biomass of 3:1 and 2:1, where the mixture of solvents comprise water: acetone in ratios between 1:2 to 1:0.

Figure 2:
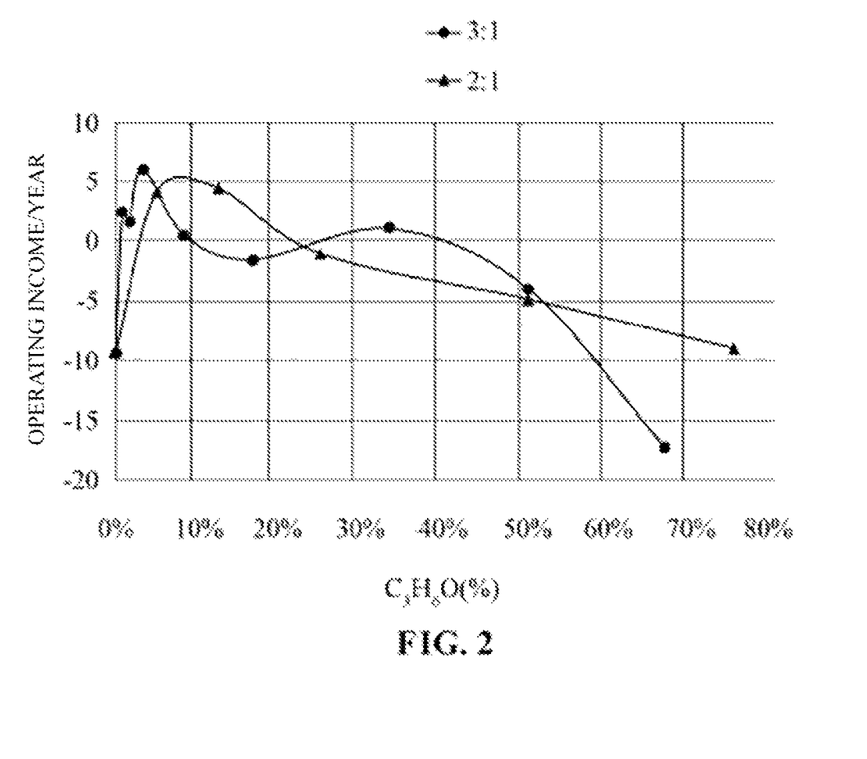
FIG. 2 Change in operating profit with percentage of acetone as solvent. ∆-microalgae: solvent ratio 2:1, ●-microalgae: solvent ratio 3:1.

As shown in FIG. 2, there is a directly proportional relationship between the solvent: biomass ratio and the operating profits of the process, when the ratio of acetone in the solvent is between 0.5% w/w and 12% w/w, obtaining the best cost values of biocrude production/barrel when acetone was used at a concentration of 3.33% w/w.

Additionally, for the solvent: biomass ratio of 3:1 to 2:1, it was shown that the operating profits are negative when only water is used in the process, as well as when the acetone concentration exceeds 12% w/w.

2.6 Evaluation of the Use of Catalyst on the Process of obtaining Biocrude

Taking into account the results of the tests described above, experiments were carried out to determine the effect of a catalyst presence on the process. Thus, the solvothermal liquefaction was carried out using a 3:1 solvent ratio, with acetone concentrations of 1.67% w/w, 3.33% w/w and 8.33% w/w, and a load of 0% or 10% of $K_2CO_3$ with respect to the biomass used.

Figure 3:
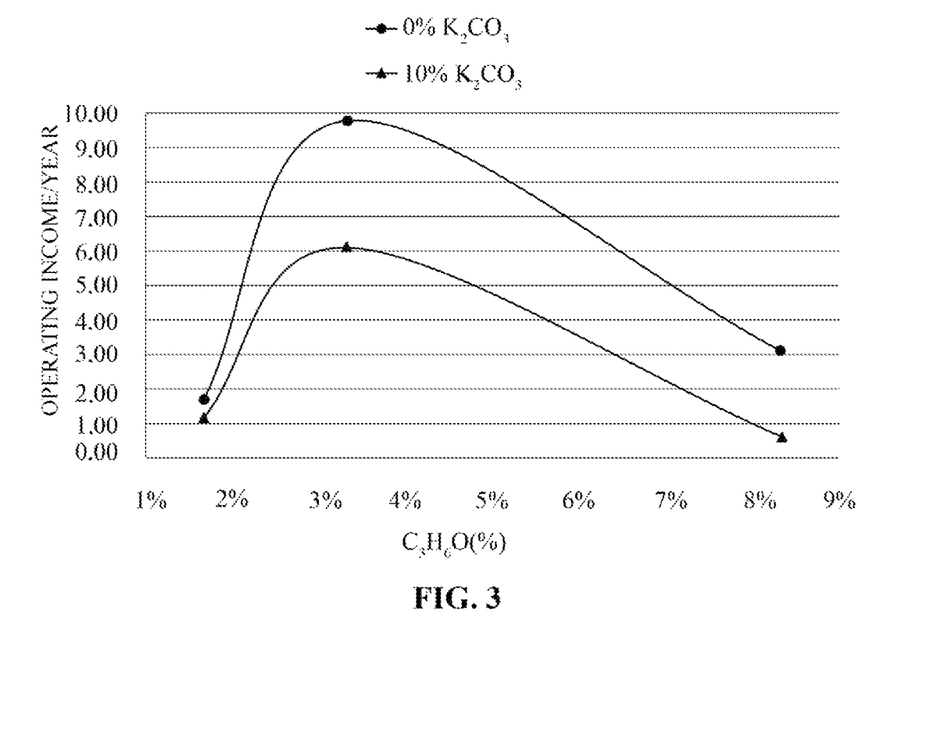
FIG. 3 Effect of the catalyst in water-acetone ($C_3H_6O$) mixtures. ∆-0% $K_2CO_3$, ●-10% $K_2CO_3$.

The results obtained show that the use of the catalyst enhances the process viability, since it increases the yield and, in turn, the operating utility (FIG. 3).

2.7 Temperature Optimization of the Solvothermal Liquefaction Process

To determine the optimum temperature value for obtaining biocrude, 3 tests were carried out at 250° C., 300° C. and 350° C., each with a solvent: biomass ratio of 3:1 and a concentration of 3.33%. w/w of acetone.

TABLE 7

Yields and HHV of biocrude obtained at different temperatures for solvothermal liquefaction of water-acetone mixtures as solvent

| Response variable | 250° C. | 300° C. | 350° C. |
|---|---|---|---|
| HHV (MJ/Kg) | 28.68 | 29.90 | 29.15 |
| Biocrude yield (%) | 58.70 | 59.50 | 48.90 |

As shown in Table 7, the best yield of the process and the product with the highest calorific value was obtained at a temperature of 300° C., so it was selected for subsequent tests.

Additionally, the effect of $K_2CO_3$ as a catalyst was evaluated, finding biocrude yields of 63% and a calorific value of 30.33 MJ/Kg.

2.8 Reuse of the Aqueous Liquid Phase in the Solvothermal Liquefaction Process

The tests described below were carried out using a temperature of 300° C., a reaction time of 45 minutes, potassium carbonate at 10% with respect to biomass, a solvent: biomass ratio of 3:1 and acetone at 3.33% w/w.

Figure 4:
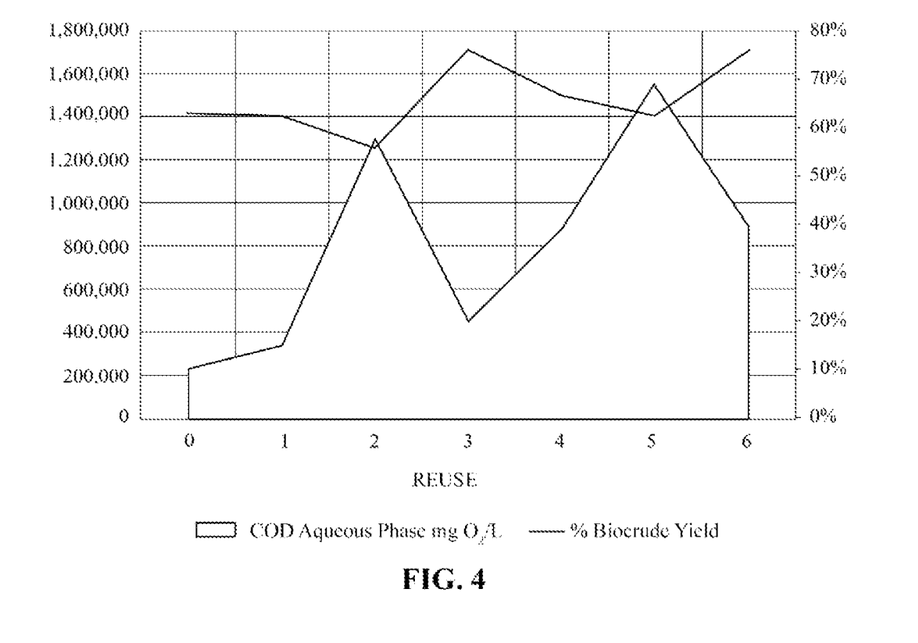
FIG. 4 Variation in the chemical oxygen demand (COD) of the aqueous liquid phase obtained and in the biocrude yield with the number of reuses of the aqueous liquid phase.

The reuse of the aqueous liquid phase makes it possible to reduce production costs, since said phase contains the catalyst. To evaluate the optimal number of potential reuses, tests were carried out where the aqueous liquid phase was used between 1 and 6 times, and where the remaining water was completed with fresh water to guarantee maintaining the concentration of 3.33% w/w of acetone and the 3:1 ratio of solvent: biomass. The results obtained are shown in FIG. 4.

It can be seen that the increase in the organic load in the process, measured by the chemical oxygen demand (COD) in each reuse, allows higher concentrations of biocrude to be obtained. It is worth noting that, in the second reuse of the aqueous liquid phase, there is an increase in COD, and the yield drops slightly, while in the third reuse, there is a considerable increase in yield and a drastic decrease in COD, which indicates that the organic compounds present in the aqueous liquid phase were integrated into the biocrude.

Example 3: Test to Enhance and Obtain Fuels Such as Diesel and Gasoline

From biocrude obtained with the optimal operating conditions described in Example 2 (300° C., a reaction time of 45 minutes, $K_2CO_3$ at 10% with respect to biomass, and a solvent: microalgae ratio 3:1, where the solvent mixture is 3.33% acetone in water), tests were carried out to enhance the product physicochemical properties.

For the enhancement process, which includes the biocrude pre-hydrogenation and hydrodenitrification, commercial catalysts HTC 600 and NiMoSx (Katalco 61-1T) were used, as well as hydrogen/biocrude molar ratios of 18, 36 and 72 with respect to a biocrude average molecular weight. To analyze the physicochemical properties of the biocrude, a fractionation process was carried out at an atmospheric pressure of 0.84 atm, in a Koehler® brand distiller with 100 mL samples, in which three fractions defined by their boiling temperature were obtained: 1) light fraction (22-187° C.), 2) medium fraction (187-388° C.) and 3) heavy fraction (>388° C.). From this process, a yield was obtained, with respect to loaded biocrude, of 50% w/w of the middle fraction (diesel-type fuel and jet fuel); and a yield of 34% w/w of the light fraction (gasoline-type fuel).

The characterization of the light and medium fractions obtained from the enhanced biocrude was carried out in an Agilent 7890A chromatograph, coupled to an Agilent 5975C mass spectrometer. For this, 0.1 mL of the product was taken and dissolved in 1.0 mL of chloroform. The injection port was at 350° C. and the oven temperature ramp was from 60° C. to 370° C. on a DB-5HT column.

TABLE 8

Chemical composition of the light
fraction of the enhanced biocrude

| Compounds | Percentage |
|---|---|
| $C_8$-$C_{12}$ alkanes | 15% |
| $C_{12}$-$C_{15}$ alkanes | 20% |
| Branched alkanes | 21% |
| Aromatics | 33.50% |
| Pyridines and quinolines | 5.90% |

TABLE 9

Chemical composition of the middle
fraction of the enhanced biocrude

| Compounds | Percentage |
|---|---|
| $C_{11}$-$C_{14}$ alkanes | 6% |
| Pentadecane | 20.5% |
| Hexadecane | 23.8% |
| Heptadecane | 17.4% |
| $C_{18}$-$C_{19}$ alkanes | 5% |
| Aromatics | 5.71% |
| Pyridines and quinolines | 6.31% |

TABLE 10

Physicochemical properties light and medium
fraction of the enhanced biocrude

| Parameters | Light fraction | Middle fraction |
|---|---|---|
| Flashpoint (° C.) | — | 56 |
| Pour point | — | −1 |
| Density (g/mL at 15° C.) | 0.8563 | 0.8716 |
| Viscosity (cm²/s at 40° C.) | 5.03 | 5.27 |
| Humidity (%) | 1.62 | 0.262 |
| Copper corrosion | — | 1b |
| Nitrogen content (%) | 1.79 | 1.85 |
| Calorific Value (MJ/Kg) | 41.20 | 44.31 |

Mass chromatography analysis of the light and medium fractions made it possible to show that a great variety of compounds such as branched and linear alkanes, aromatics, phenolic compounds and pyridines are found in the first fraction (Table 8); while pentadecane, hexadecane and heptadecane are found in the middle fraction, representing approximately 62% of the total compounds (Table 9). It should be noted that in both fractions a high content of aliphatic hydrocarbons with very few aromatic compounds was found, which would enhance hydrocarbon emissions.

Additionally, it was shown that the enhancement process allowed reaching a nitrogen removal percentage of 73%, reaching nitrogen contents in the enhanced biocrude of less than 1% (Table 10). Likewise, it was found that both the light fraction and the medium fraction have calorific power values comparable to conventional biodiesel (38-39 MJ/Kg) and petrochemical diesel (44 MJ/Kg).

Finally, it was possible to obtain a yield of 2.69 barrels of fuel from one ton of microalgae, which represents 22% more than that reported by other authors under similar conditions.

Figure 5:
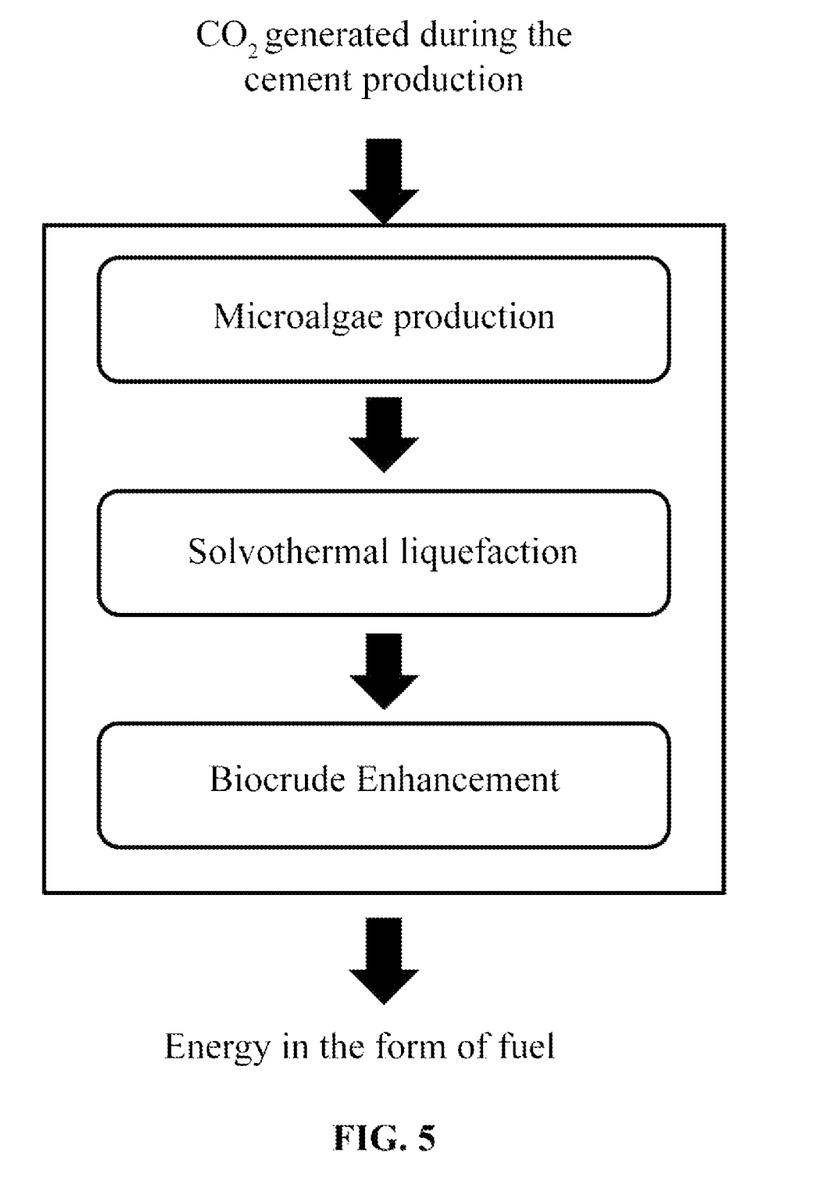
FIG. 5 Stages for the life cycle analysis of fuel production from solvothermal liquefaction of microalgae.

Example 4: Life Cycle Analysis of Fuel Production from Solvothermal Liquefaction An analysis of the life cycle in the production of fuels from biocrude was carried out, which included the processes for obtaining microalgae at an industrial level, the solvothermal liquefaction of the microalgae biomass and the biocrude enhancement process (FIG. 5).

In particular, the production of fuel from microalgae biomass consists of two main stages. The first stage is $CO_2$ capture, in which the emissions of this gas, generated in the production of cement, are received and transformed by microalgae into microalgal biomass. For this process to occur, there must be a constant supply of nutrients to meet the demands for nitrogen, phosphorus and potassium, electrical energy supply for the distribution of residual gases in the photobioreactors and replacement water.

The second stage corresponds to the transformation of the microalgae biomass into fuels such as diesel and gasoline, the use of high temperatures, inorganic catalysts, a reducing atmosphere, solvents, water and electricity is required, in addition to this due to the characteristics of the process there is co-generation of energy from sub-currents derived from the process.

With the help of the OpenLCA software and access to its ECOINVENT 3.1 databases, an estimate was made of the possible $CO_2$ emissions associated with each of the stages; taking into account the inputs, energy and other features. The change in $CO_2$ emissions is described by the following balance:

$$\Delta CO_2 = -A - B + C + D$$

Wherein:
$\Delta CO_2$=Change in $CO_2$ emissions
A=$CO_2$ cement
B=$CO_2$ Extraction and refining of biocrude
C=$CO_2$ Microalgae production
D=$CO_2$ Solvothermal liquefaction The results obtained showed that by implementing the process, more than 91 Kg of $CO_2$ are captured for each GJ of energy in the fuels produced (Table 11), mitigating the environmental impact and reducing the emissions of this greenhouse gas associated with the cement production process in a remarkable way. In particular, −3.11 Kg $CO_2$ per Kg of diesel produced under this technology are captured, compared to petrochemical diesel which emits 0.29 Kg $CO_2$ per Kg of diesel.

TABLE 11

$CO_2$ emissions in the fuel production process from
the solvothermal liquefaction of microalgae associated
with the cement production process.
Calculation per functional unit (Kg $CO_2$/GJ)

| | |
|---|---|
| $CO_2$ associated with cement production | 97.282 |
| Microalgae production | 1.159 |
| Biomass transformation LHT and refining | 11.020 |
| Extraction and refining of conventional crude oil | 6.444 |
| Overall balance | −91.547 |

Regarding the process of microalgae and transformation to fuels, an emission of 12.180 Kg $CO_2$/GJ is generated, which contrasts with that reported by other authors such as Fortier and collaborators, who estimated this same emission close to 16 Kg $CO_2$/GJ (Fortier, M P, et al., 2020. *Applied Energy*, 122: 73-82), in which the transportation and distribution of fuels are not included, as is the present development.

For conventional palm biodiesel, an emission of 0.1935 Kg $CO_2$/Kg of biodiesel is estimated, including the capture process in the production of palm oil (−1.057 Kg $CO_2$/Kg palm oil) in the part agriculture, according to the ECOINVENT 3.1 databases and the OpenLCA software. If it is included that part of the petrochemical diesel is replaced, which has an emission of 0.286 Kg $CO_2$/Kg, -0.0925 Kg $CO_2$/Kg would be captured. In the production of diesel by the microalgae LHT process, a capture of -3.11 Kg $CO_2$ per Kg diesel was estimated, showing a greater capture of $CO_2$, which is attributed to the capture of this gas by the microalgae.

The invention claimed is:

1. A process to obtain a biocrude from biomass, comprising:
    subjecting a biomass to solvothermal liquefaction in the presence of a mixture of solvents, until obtaining a gaseous phase, a solid phase, an aqueous liquid phase and an organic liquid phase comprising the biocrude;
    wherein the mixture of solvents comprises between 0.5% w/w and 99.5% w/w of water and at least one solvent;
    wherein the solvent is selected from the group consisting of alcohols, ketones, aldehydes, or precursors thereof under processing conditions; and
    wherein the biocrude is obtained with a yield greater than or equal to 30%;
    wherein the process is optionally carried out in the presence of a catalyst that is selected from the group comprising carbonates, bicarbonates, acetates of alkali and alkaline earth metals, or a combination thereof and said catalyst is in a concentration between 0.1% w/w and 20% w/w.

2. The process of claim 1, wherein the solvothermal liquefaction is carried out in the presence of a reducing atmosphere that is selected from hydrogen, carbon monoxide (CO), carbon dioxide ($CO_2$), or a combination thereof, pure or mixed with water steam.

3. The process of claim 1, wherein the solvothermal liquefaction is carried out in a time between 5 to 60 minutes.

4. The process of claim 1, wherein the biomass is in a concentration of 5% w/w to 70% w/w.

5. The process of claim 1, wherein the biomass is microalgae biomass.

6. The process of claim 1, wherein the water of the solvent mixture is in a concentration between 92% w/w and 99% w/w.

7. The process of all the previous claims, wherein the biocrude yield obtained is greater than or equal to 40%.

8. The process of claim 1, wherein the aqueous liquid phase, the catalyst and/or the solvent are recovered and reintegrated, totally or partially.

9. The process of claim 1, wherein the biocrude obtained has a percentage of sulfur that is less than or equal to 1% w/w.

10. The process of claim 1, wherein the process comprises:
    subjecting biomass to solvothermal liquefaction at a temperature between 250 and 350° C. for 30 to 60 minutes in a reducing atmosphere, in the presence of a mixture of acetone and water, and in the presence of potassium carbonate in a concentration between 8 and 12% w/w with respect to the biomass, until obtaining a gaseous phase, a solid phase, an aqueous liquid phase and an organic liquid phase that comprises the biocrude;
    wherein preferably the biomass is microalgae biomass in a concentration between 15 and 35%;
    wherein the ratio of acetone in the solvent is between 0.5% w/w and 12% w/w; and
    wherein the biocrude yield obtained is greater than or equal to 50%.

* * * * *